United States Patent [19]

Nowak et al.

[11] Patent Number: 6,022,914
[45] Date of Patent: *Feb. 8, 2000

[54] PRESSURE-SENSITIVE ADHESIVE COMPOSITION AND TAPES

[75] Inventors: Petra Nowak, Uebach-Palenberg, Germany; Robert D. Waid, Oakdale; William D. Coggio, Woodbury, both of Minn.

[73] Assignee: 3M Innovative Properties Company, Saint Paul, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/563,153

[22] Filed: Nov. 27, 1995

[51] Int. Cl.⁷ .......................... C08K 5/3477; C08K 5/52; C08K 3/20; C08K 3/26

[52] U.S. Cl. ...................... 524/101; 524/80; 524/100; 524/115; 524/130; 524/132; 524/139; 524/145; 524/147; 524/151; 524/152; 524/153; 524/195; 524/237; 524/270; 524/271; 524/272; 524/273; 524/274; 524/405; 524/429; 524/425; 524/427; 524/436; 524/437

[58] Field of Search .................. 524/80, 145, 437, 524/100, 101, 115, 130, 132, 139, 195, 237, 424, 425, 427, 436, 405, 147, 151, 152, 153, 270, 271, 272, 273, 274

[56] References Cited

U.S. PATENT DOCUMENTS

| | | | |
|---|---|---|---|
| 3,515,578 | 6/1970 | Tomita et al. | 117/122 |
| 3,843,590 | 10/1974 | Hombach et al. | 524/427 |
| 3,923,722 | 12/1975 | Lakshmanah | 524/426 |
| 4,061,826 | 12/1977 | Petras et al. | 428/356 |
| 4,217,434 | 8/1980 | Koeble | 524/145 |
| 4,223,067 | 9/1980 | Levens | 428/308 |
| 4,359,551 | 11/1982 | Suda et al. | 524/145 |
| 4,415,618 | 11/1983 | McClung, Jr. | 428/88 |
| 4,440,888 | 4/1984 | Cook et at. | 524/145 |
| 4,569,960 | 2/1986 | Blake | 524/145 |
| 4,599,265 | 7/1986 | Esmay | 428/355 |
| 4,699,824 | 10/1987 | Pufahl | 428/220 |
| 4,710,536 | 12/1987 | Klingen et al. | 524/493 |
| 5,116,676 | 5/1992 | Winslow | 524/145 |
| 5,198,483 | 3/1993 | Gainer | 524/100 |
| 5,416,134 | 5/1995 | Skoplund | 524/145 |
| 5,484,830 | 1/1996 | Staendeke | 524/101 |
| 5,496,636 | 3/1996 | Gu et al. | 428/352 |
| 5,851,663 | 12/1998 | Parsons et al. | 524/415 |

FOREIGN PATENT DOCUMENTS

| | | |
|---|---|---|
| 0 257 984 | 3/1988 | European Pat. Off. . |
| 0 301 764 | 2/1989 | European Pat. Off. . |
| 0 685 546 A1 | 4/1995 | European Pat. Off. ........... C09J 7/04 |
| 44 19 169 a1 | 12/1995 | Germany . |
| 7-26153 | of 0000 | Japan . |
| 44234 | 4/1975 | Japan .................... 524/272 |
| 155075 | 12/1980 | Japan .................... 524/139 |
| 116768 | 9/1981 | Japan .................... 524/426 |
| 151482 | 7/1987 | Japan .................... 524/151 |
| 234485 | 9/1989 | Japan .................... 524/272 |
| 8-193187 | 7/1996 | Japan . |
| 789556 | 12/1980 | Russian Federation ............... 524/405 |
| 1 309 873 | 7/1973 | United Kingdom . |
| 2 001 997 | 2/1979 | United Kingdom . |
| WO 90/01411 | 2/1990 | WIPO . |
| WO 94/11425 | 5/1994 | WIPO . |
| WO 95/13331 | 5/1995 | WIPO . |

OTHER PUBLICATIONS

"Flame Retardant Polymers Current Status and Future Trends", Makromol, Chem., Macromol, Symp. 74, 125–135 (1993).

Jurgen Troitzsch (ed.), International Plastics Flammability Handbook, Hanser Publishers, Munich, pp. 52–53 (1990).

"Modifying Resins for Acrylic Polymers", Donatas Satas (ed.), Handbook of Pressure Sensitive Adhesive Technology, New York, 1989, pp. 567–600.

"The Relationship Between Thermal Degradation and Flammability", Makromol, Chem., Macromol, Symp. 74, 11–20 (1993).

*Primary Examiner*—Peter A. Szekely
*Attorney, Agent, or Firm*—Doreen S.L. Gwin

[57] ABSTRACT

The present invention relates to a pressure-sensitive adhesive composition containing a non-halogen, non-intumescent flame-retardant system comprising at least one flame-retardant agent with the provisos that the flame-retardant system does not comprise $Sb_2O_3$ or does not consist only of alumina trihydrate.

19 Claims, No Drawings

6,022,914

PRESSURE-SENSITIVE ADHESIVE COMPOSITION AND TAPES

FIELD OF THE INVENTION

This invention relates to flame-retardant pressure-sensitive adhesive compositions and to flame-retardant pressure-sensitive adhesive tapes.

BACKGROUND OF THE INVENTION

Pressure-sensitive adhesive compositions find use in a wide variety of applications, such as the automotive, aerospace, construction and electrical markets, either in the form of tapes or as adhesive coatings on other backings. For many of these applications, good flame retardant properties are of considerable importance.

U.S. Pat. No. 3,515,578 (Tomita) describes an acrylate-based pressure-sensitive adhesive composition comprising tris-(halogenated alkyl) phosphate and antimony oxide. U.S. Pat. No. 4,061,826 (Petras) describes a pressure-sensitive adhesive composition for use in an electrical insulating tape where the adhesive comprises highly halogenated organic materials such as decabromodiphenyloxide. WO 90/01411 (La Mar) describes a double-coated cloth adhesive tape for the aircraft industry having a flame retardant system in the pressure sensitive adhesive. The single flame retardant agent described is FYROL CEF available from Stauffer Chemical. This is a chlorinated phosphate (tri (beta-chloroethyl) phosphate)).

Halogenated flame-retardant agents, however, have considerable drawbacks in terms of smoke production and toxicity concerns, relating both to combustion products and also to disposal of the compounds themselves. A further limitation of the use of halogenated flame retardant agents in pressure-sensitive adhesives is that during combustion they emit larger amounts of corrosive smoke. Combustion products of halogen containing materials, in particular HCl and HBr, contribute significantly to these effects. The corrosivity of smoke is of particular importance in electrical/electronic applications, since a small fire involving halogenated insulation materials may generate sufficient corrosive combustion products to cause widespread dame to other equipment not directly involved in the fire.

In case of pressure-sensitive adhesive tapes supported by a backing, it has also been suggested to incorporate the flame-retardant system into a polymeric film backing of the adhesive tape rather than into the pressure-sensitive adhesive itself. JP 05-345,882 describes a flame agent retardant pressure-sensitive adhesive tape containing a flame retardant system selected from the group of 1) hydrates of metal oxides such as magnesium hydroxide and alumina trihydrate and 2) red phosphorus. The flame retardant system is incorporated into the polyolefin-based backing of the adhesive tape.

This approach is, however, not applicable to unsupported layers of adhesive (transfer tapes) which are becoming increasingly useful as components for mounting and attachment of surfaces. In this situation, if flame retardance is desired, it must be introduced into the pressure-sensitive adhesive itself as there is no backing or supporting film present.

Consequently, there is a need for providing flame-retardant pressure-sensitive compositions with an acceptable or good overall balance of properties using non-halogenated flame-retardant systems or agents.

Flame-retardant systems can be classified according to whether they exhibit intumescent or non-intumescent properties. Pressure-sensitive adhesives containing an intumescent, fire-retardant system, create when burned, a foamed char layer, which impedes heat-transfer and may operate as a sealant thus suppressing spreading of fire. Intumescent, fire-retardant systems are typically complicated formulations usually comprising a "carbonific" part, i.e. a source of carbon, an acid source and a "spumific" part (or blowing agent) evolving gaseous products which blow the char up into the form of a foam. These functions are usually provided by a system comprising three or more compounds. An exception is ammonium polyphosphate (APP) which according to J. Troitzsch, Makromol. Chem., Makromol. Symp., 74 (1993), 125–135, p. 131, section 'Intumescent Flame-Retardant Systems' provides both acid and spumific functions. An intumescent system comprising APP can therefore comprise two or more compounds.

Pressure-sensitive adhesives containing a non-halogen intumescent flame-retardant system are described in WO 94,11,425 filed on May 19, 1995, by the present applicant. This reference lists on page 4 a number of commercially available intumescent formulations and cites further formulations described in literature.

There are, however, many applications such as, for example, bonding of non-functional surfaces in the transportation or building and construction industry where flame retardance properties are essential while intumescence is not. Since intumescent flame-retardant systems are typically relatively complicated formulations, it was desirable to provide non-intumescent pressure-sensitive adhesive compositions comprising non-intumescent, flame-retardant systems comprising one or more flame-retardant agents. It was also desirable to provide another class of flame-retardant pressure-sensitive adhesive compositions as an alternative to the compositions described in WO 94/11,425 to enlarge the pool of flame-retardant pressure-sensitive adhesive compositions which is accessible to the person skilled in the art.

SHORT DESCRIPTION OF THE INVENTION

The present invention relates to a pressure-sensitive adhesive composition comprising a non-halogen, non-intumescent flame-retardant system comprising one or more flame-retardant agents with the provisos that the flame-retardant system does not comprise $Sb_2O_3$ or does not consist only of alumina trihydrate.

The present invention, furthermore, relates to unsupported adhesive tapes (or transfer tapes) and to supported adhesive tapes containing a backing which comprise the pressure-sensitive adhesive composition specified above.

DETAILED DESCRIPTION OF THE INVENTION

As used above and below, the term flame-retardant refers to pressure-sensitive adhesive compositions and formulations in which basic flammability has been reduced by adding a flame-retardant system and is measured according to U.S. Federal Aviation Regulation 25.853 referred to below. A pressure-sensitive composition or formulation is said to be flame-retardant if it passes the after flame test, the burn length test and the drip flame time test as described below.

As used above and below, the term non-intumescent refers to pressure-sensitive adhesive compositions comprising a flame-retardant system which is not intumescent. In Jürgen Troitzsch (ed.), International Plastics Flammability Handbook, Munich, 1990, it is stated on p. 52, section 5.1.3 that the intumescent effect is achieved by using four components:

(i) an acid source such as an inorganic non-volatile acid like boric, sulphuric or phosphoric acid or salts of phosphoric acid like ammonium phosphate or APP. The acid source causes the dehydration of the carbonific compound and its subsequent charring.
(ii) carbonific compounds which typically are polyhydroxy compounds such as pentaerythritol, starch and phenolic or urea resins. The polyhydroxy compounds dehydrate and char due to acid attack which proceeds via an esterification reaction.
(iii) spumific compounds such as chloroparaffins, melamine and guanidine. Under the effect of temperature these compounds liberate large quantities of non-combustible gases and ensure the formation of the carbonaceous foam layer over the substrate.
(iv) resin binders which are said to cover the foam with a skin which prevents the gases escaping (optional component).

A similar definition of intumescent systems is given in Ian C. McNeill, Makromol. Chem., Makromol. Symp., 74 (1993), 11–20, where it is said on p. 19, section 'Intumescent Fire Retardants' that suitable compounds for intumescent formulations fall into four categories: inorganic acid source, carbon-rich polyhydric compounds, amines or amides and halogenated compounds.

The non-intumescent, flame-retardant systems used in the present invention do not comprise all components necessary to render a formulation intumescent, and they are not covered by the above descriptions. Pressure-sensitive adhesive compositions comprising an intumescent, flame-retardant system create a foamed char layer when heated. Contrary to this, the pressure-sensitive adhesive compositions according to the present invention, might undergo deformations and even provide char layers when heated which layers are, however, not foamed.

As used above and below, the term non-halogen refers to flame-retardant systems comprising no halogenated compounds.

Pressure-sensitive adhesive compositions which are useful in the present invention, comprise any pressure-sensitive adhesive material.

In a preferred embodiment, the pressure-sensitive adhesive composition is based on an acrylic pressure sensitive adhesive material selected from a wide variety of polymers and copolymers derived from acrylic and/or methacrylic acid, or ester, amide and nitrile derivatives thereof. Mixtures of different polymers and copolymers can be used. The polymers and copolymers preferably have a glass transition temperature of less than 0° C. so that the mass of polymer is tacky at ambient temperatures. Examples of useful acrylate-based pressure-sensitive adhesive materials include homopolymers and copolymers comprising isooctylacrylate, 2-ethylhexylacrylate, isoamylacrylate, nonylacrylate and butylacrylate and their copolymers or terpolymers with acrylic acid, methacrylic acid, acrylamide, methacrylamide, acrylonitrile and methacrylonitrile. It is also possible to incorporate nonpolar acrylic monomers whose homopolymers have a relatively high Tg such as, for example, isobornylacrylate (WO 95/13,331 and WO 95/13,328).

Acrylic pressure-sensitive adhesive materials useful in the present invention may also comprise tackifying resins. In many instances, the balance of adhesive properties of an acrylic pressure-sensitive adhesive material is tailored to a specific application by use of a tackifying resin in conjunction with the acrylic base polymer. Tackifiers for acrylic pressure-sensitive adhesive materials are well known and are described in Handbook of Pressure Sensitive Adhesives (Satas, ed.), Second Ed., 1989, pp. 567–600.

For certain applications, particularly application to rough surfaces, it is necessary for the adhesive layer to be relatively thick, for example 0.5 to 5 mm. Such thick coatings of adhesive compositions tend to be difficult and expensive to manufacture by traditional adhesive coating techniques. So-called "foam" adhesive materials were developed to meet this need. Such an adhesive material may be in the form of a foam having open or closed cells, generated in the adhesive mass by using a frothing procedure or incorporation of hollow microspheres to produce a cellular structure. In foam adhesive materials, up to 65% of the volume of the pressure-sensitive adhesive material comprises voids created by frothing (mixing with gas) or incorporation of hollow microspheres (polymeric or glass microbubbles, for example). Pressure-sensitive foams of this type are described, for example, in U.S. Pat Nos. 4,223,067, 4,415, 615 and EP 0,257,984. Thus acrylate-based foam type pressure-sensitive adhesive materials can also be used in the present invention.

In another preferred embodiment, the base pressure-sensitive adhesive material of the composition of the present invention can be selected from a wide variety of rubber-resin based materials. The rubber material preferably comprises an elastomer of natural or synthetic rubbers, including styrene butadiene elastomers, styrene isoprene elastomers, polybutadienes and polyisobutylenes, as well as silicone-based rubbers.

The rubber resin material preferably comprises a tackifying resin of the sort commonly used in conjunction with rubbers to produce pressure-sensitive adhesive systems. These include tackifying resins such as glyceryl esters of hydrogenated resins, thermoplastic terpene resins, petroleum hydrocarbon resins, coumarone-indene resins, synthetic phenol resins, low molecular weight polybutenes and tackifying silicone resins.

Generally, a tackifying resin is included into the rubber resin material in a proportion of 40 to 150 parts per one hundred parts of the rubber resin material.

It is to be understood that the pressure-sensitive adhesive materials described, are given by way of example only and do by no means limit the scope of the invention.

The flame-retardant systems useful in the pressure-sensitive adhesive compositions of the present invention, comprise one or more and preferably 1 or 2 flame-retardant agents. The term flame-retardant agent as used above and below, refers to compounds which inherently or only when combined with other compounds, exhibit flame-retardant properties.

The flame-retardant agents are selected so that the flame-retardant system obtained does not exhibit intumescent properties as was described above. The flame-retardant agents to be used in the flame-retardant systems of the present invention can be selected from the group of nitrogen-containing flame-retardant agents (referred to above and below as N-containing flame-retardant agents), from the group of phosphorus-containing flame-retardants (referred to above and below as P-containing flame-retardant agents), from the group of flame-retardant agents containing both N and P atoms (referred to above and below as N/P-containing flame-retardant agents) and from the group of inorganic flame-retardant agents Examples for N-containing flame-retardant agents are melamines, triazines, isocyanurates and urea and guanidin and their derivatives. In a preferred embodiment, the flame-retardant system consists of 1 or 2 N-containing flame-retardant agents. Especially preferred are melamine cyanurate and its derivatives which can be used alone or together with other N-containing and/or P-containing flame-retardant agents. It was found that pressure-sensitive adhesive compositions containing a flame-retardant system comprising cyanuric acid or its derivatives and, in particular, melamine cyanurate or its derivatives, are characterized by advantageous values of static shear and peel adhesion.

Examples of P-containing flame-retardant agents are phosphines, phosphine oxides, phosphonium compounds, phosphonates, elemental red phosphorus, phosphites and phosphates. The flame-retardant system to be used in the present invention, may consist of one or more P-containing flame-retardant agents but preferably comprises at least one P-containing and at least one N-containing flame-retardant agent. Especially preferred are flame-retardant systems comprising elemental red phosphorus and at least one N-containing flame-retardant agent. Especially preferred are, furthermore, N/P-containing flame-retardant agents like hexaphenoxycyclotriphosphazene containing N and P atoms. In case of flame-retardant systems comprising at least one N-containing and at least one P-containing flame-retardant agent, the ratio of the weight of the N-containing agents to the weight of the P-containing agents preferably is between 0.05 and 5 and, in particular, between 0.2 and 2.5.

Pressure-sensitive adhesive compositions having a flame-retardant system comprising at least one N-containing and at least one P-containing flame-retardant agent or at least one N/P-containing flame-retardant agent, exhibit advantageous flame-retardance and adhesion properties.

Another class of flame-retardant agents which is useful for the pressure-sensitive adhesive compositions of the present invention are inorganic flame-retardant agents such as alumina trihydrate (=aluminum oxide trihydrate, sometimes also referred to as aluminum hydroxide), magnesium hydroxide, calcium carbonate, magnesium carbonate and boron containing compounds such as zinc borate or barium or calcium metaborate. While flame-retardant systems consisting only of alumina trihydrate are not within the scope of the present invention, combinations of alumina trihydrate with other flame-retardant agents such as, in particular, N-containing, P-containing and/or N/P-containing compounds were found to be particularly useful. Especially advantageous are flame-retardant systems comprising elemental red phosphorous and aluminum hydroxide.

The flame-retardant system is present in the pressure-sensitive adhesive composition of the present invention in an amount of between 1–75 parts based on 100 parts dry mass of the pressure-sensitive adhesive materials (which is also termed as pph). It was, however, found that the degree of flame-retardance imparted is usually not high enough for many applications if the amount of the flame-retardant system is lower than 5 parts by weight so that the range between 1–5 parts is usually not preferred. The inherent properties of the pressure-sensitive adhesive material are often deteriorated to a degree unacceptable for many applications if the amount of the flame-retardant agents is higher than 55 parts by weight so that the range between 55–75 parts also usually is not preferred. The flame-retardant system is especially preferably present in amount of from 10 to 50 parts by weight relative to the dry mass of the pressure-sensitive adhesive material.

The pressure-sensitive adhesive compositions according to the present invention comprise halogen-free, non-intumescent, fire-retardant systems. These compositions can be used for the preparation of pressure-sensitive adhesive formulations comprising a composition according to the invention wherein one or more halogenated flame-retardent agents are added to the non-intumescent, non-halogen, flame-retardent system of the composition in a relatively small amount of less than 25 parts by weight with respect to the mass of the flame-retardant system. These formulations which are not preferred, can be used for applications where a small amount of combustion gases is tolerable. An advantage of these formulations is that the overall amount of the flame-retardant system can often be reduced to give the same degree of flame-retardancy as obtainable with the corresponding, halogen-free flame-retardant system. Halogen-containing flame-retardant agents which are useful in the present invention comprise, for example, brominated and chlorinated aliphatic compounds and compounds containing aromatically bound bromine. Especially preferred are, for example, tetrabromobisphenol A and ethylene-bis-tetrabromophthalimides.

Halogenated flame-retardant agents are, however, often toxic in their natural state and give off toxic fumes when burned so that they are used despite their outstanding flame-retardant properties only in minor amounts of not more than 50 parts by weight, preferably of not more than 10 parts by weight and and especially preferably of less than 25 parts by weight. It was, furthermore, found that halogenated flame-retardant agents often adversely affect the properties of the pressure-sensitive adhesive material to a higher extent than non-halogenated flame-retardant agents so that the flame-retardant system in the most preferred embodiment of the formulations of the present invention is less than 10 wt. %.

The flame-retardant system is incorporated into the pressure-sensitive adhesive material using conventional techniques. The pressure-sensitive material which may be dissolved in an organic solvent or may be present in the form of a latex, is mixed intimately with the flame-retardant system using high speed, high shear mixers. It is desirable for the flame-retardant system to be distributed uniformly throughout the pressure-sensitive material. The flame-retardant particles which preferably are as small as possible, typically have a diameter of below 50 $\mu$m.

The mixing must be accomplished, however, without substantially altering the pressure-sensitive adhesive material. If solvent-borne adhesive materials or solvent-free adhesive materials are mixed extensively under high shear conditions, the molecular weight of the adhesive material can be substantially reduced, thus causing a deterioration of the pressure-sensitive adhesive properties, in particular the static shear values which reflect the cohesive strength of the pressure-sensitive adhesive material.

If latex pressure-sensitive adhesive materials are subject to high shear conditions for extended periods, the latex may destabilize or coagulate. High shear mixing of latex pressure-sensitive adhesive materials must also be limited due to the amount of foam generated during the mixing process. If large amounts of air are entrapped in the latex during mixing, then a uniform coating of the pressure-sensitive adhesive material free of voids, is difficult to obtain. In some cases, the flame-retardant system must be predispersed in small amounts of solvent or pressure-sensitive adhesive material and then added to the adhesive solution or latex.

In another process, the flame-retardant system can also be mixed with an unpolymerized or partly polymerized precursor of the pressure-sensitive adhesive material which can subsequently be polymerized with various techniques, with photoinitiated bulk polymerization being preferred. This solventless polymerization process is described in some detail, for example, in WO 95/13,331, U.S. Pat. Nos. 4,599,265, or 4,710,536.

It has also been found to be important that the flame-retardant agents selected be largely chemically unreactive with respect to the pressure-sensitive adhesive material. If the flame-retardant agent catalyzes or takes part in a chemical reaction involving any component of the pressure-sensitive adhesive material, including tackifiers, surfactants, protective colloids or other additives, then the chemical nature of the pressure-sensitive adhesive material may be substantially altered, rendering it less useful or completely non-functional as a pressure-sensitive adhesive material. Chemical reactions can result in crosslinking of the adhesive material. This can be manifested by the formation of an intractable mass or gel, or can result in a solution of excessive viscosity which can not be readily coated or can result in adhesive compositions which have reduced surface tack and a substantially deteriorated balance of adhesive properties.

The person skilled in the art can easily modify and optimize the method of preparation of a composition according to the present invention on the basis of the present specification.

The compositions according to the present invention can comprise further compounds and additives such as, for example, tackifiers, surfactants, protective colloids or thermally and/or electrically conductive particles. The person skilled in the art is familiar with these additives which are described, for example, in D. Satas (ed.), Handbook of Pressure Sensitive Adhesive Technology, N.Y., 1989. Pressure-sensitive adhesive foam-type according to the present invention, particularly acrylate based materials, may also include glass bubbles, typically at levels up to 10 parts per 100 parts of the pressure-sensitive adhesive material.

The pressure-sensitive adhesive composition of the present invention may be coated onto a substrate to form a layer by any conventional coating technique commonly used for pressure-sensitive adhesive such as spraying, brushing or dipping. More preferably, the adhesive layer is coated onto a substrate by knife-coating or roll coating, optionally followed by evaporation of the aqueous or solvent medium in case of a solvent-borne precursor. A layer of pressure-sensitive adhesive may also be created by extrusion or hot melt coating of the composition of the present invention in a solvent-free form.

After the layer of the pressure-sensitive adhesive composition of the present invention is formed on a substrate, it may be subsequently treated with UV or e-beam radiation to alter the pressure sensitive properties via crosslinking, in accordance with known techniques.

Flame-retardant pressure-sensitive adhesive compositions of the present invention may be used in the form of transfer tapes. Transfer tapes are thin layers of pressure-sensitive adhesive materials which have no backing and thus expose the adhesive composition on both surfaces. Transfer tapes are made by coating a layer of pressure-sensitive adhesive onto a release liner, resulting in a layer of pressure-sensitive adhesive which can be removed from the liner and used to bond two substrates together.

In transfer tape constructions, the adhesive layer usually has thickness of less than 200 microns, and preferably of 20–150 $\mu$m. In pressure sensitive adhesive foams, however, the thickness of the adhesive layer in general is in the range of 0.5 to 5 mm.

Flame-retardant pressure-sensitive adhesive compositions of the present invention may also be used in the form of supported tapes such as single-coated or double-coated tapes wherein a layer of the pressure-sensitive adhesive composition of the present invention is laminated onto or coated directly onto either one or both sides of a backing. Materials which are suitable as backing include, for example, polymeric films such as polyethyleneterephthalate, polimide and pololefins such as oriented polypropylene. Papers or plastics which are either woven or non-woven, and metal foils can also be used as backings for tapes of the present invention.

In single-coated or double-coated tapes, the backing preferably has a thickness of from 15 to 200 $\mu$m, and the adhesive layers typically exhibit a thickness of from 50 to 200 $\mu$m. Tape constructions deviating from the constructions described here, are also possible.

Particularly useful in the present invention are backings which themselves lend additional flame-retardant properties to the tape construction. These include glass cloth, for example, or polymeric backings, such as polyimides, or papers which themselves contain or have been treated with flame-retardants.

The pressure-sensitive adhesive compositions and the corresponding tapes of the present invention surprisingly exhibit a combination of good flame-retardant properties and good adhesion properties which typically are comparable with those of the corresponding pressure-sensitive material comprising no flame-retardant system. In some cases, particularly when large amounts of flame-retardant systems are employed, there will be a reduction in the tackiness of the adhesive composition. This problem may readily be overcome by overcoating such an adhesive composition with a thin layer, e.g. 25 $\mu$m or less, preferably 5 to 10 $\mu$m, of an adhesive containing no flame-retardant system or a low level of flame-retardant system which does not inhibit the tackiness of the adhesive. The overall two layer combination displays good tack and adhesive properties, and surprisingly the presence of the top coat does not detract from the flame-retardant performance.

The pressure-sensitive adhesive compositions and the corresponding tapes according to the present invention are preferably used in electrical or electronic applications or in the transportation and building and construction industry.

The following examples illustrate the invention without limiting it. Prior to this, some test methods are described which are used in the examples.

Test Methods
1. Flame-Retardant Tests
   a) Preparation of samples for flame-retardance tests
   The flame-retardant system and a solution of the pressure-sensitive adhesive material, either solvent-borne or water-borne, were combined and mixed to a homogeneous dispersion using a high speed commercial blender. Specific mixing conditions for each of the flame-retardant systems used are described in the related examples.

The solution of the adhesive material containing the flame-retardant system, was then coated onto an adhesive-repellent release liner using a knife coater at a thickness calculated to give a dry adhesive layer thickness of approximately 100 microns or less (actual thickness of the adhesive layer is given in the below tables).

The layer of the adhesive composition was then dried. Water-borne adhesive compositions were dried for 10 min at 100° C. in a forced air oven and solvent-borne adhesive composition were dried 10 min at room temperature and then 10 min at 70° C. in a forced air oven.

Flame-retardance tests were not performed on the layer of the adhesive composition alone, but rather on the layer of the adhesive composition in combination with other materials in a laminate. The laminate constructions more clearly reflect the influence of the flame-retardant constructions were evaluated in the flame-retardance tests:

1. Polyethylene foam/Aluminum construction (PE/Al) The layer of the pressure-sensitive adhesive composition, having been removed from the release liner, was laminated between a 2 mm layer of polyethylene foam (Wilhelm Köpp Zellkautschuk, Plastazote LD 24FR) and a 25 micron sheet of aluminum foil. Overall size of the finished test sample was 70 mm×300 mm×approximately 2.1 mm.

2. Polyethylene foam/phenolic laminate construction (PE/PP) The layer of the pressure-sensitive adhesive composition was laminated between a 2 mm layer of polyethylene foam (see above) and phenolic laminate provided by Daimler Benz Aerospace Airbus (thickness about 400 μm; laminate of DAN 407-08 with DAN 407-02 whereby DAN 407-08 was laminated onto the pressure-sensitive adhesive layer) which approximates use conditions in airplanes. Overall size of the finished test samples was 70 mm×300 mm×approximately 2.5 mm.

b) Test procedure

An industry standard test known as a vertical burn test (U.S. Federal Aviation Regulation 25.853) was used to evaluate flame-retardance of the pressure-sensitive adhesive composition of the present invention. Panels of the adhesive composition-containing construction described above were held vertically over a Bunsen burner flame at a distance of 19 mm from the top of the burner for 12 seconds, the flame height was 38 mm. Then the flame was removed. The following three parameters were then measured according to FAR 25.853:

1. Length of time for which the sample continued to burn after the flame had been removed (after flame time).
2. Height of the burn surface as defined in FAR 25.853 test standard. This area does not include areas which are only stained or discolored with soot, nor areas where the materials have shrunk in response to the heat (burn length).
3. Length of time that any flaming material continues to flame after falling from the test panel to the floor of the chamber (drip flame time). The drip flame time is reported to be 0 sec if no material falls from the test panel.

A pressure-sensitive adhesive composition or formulation is said to be flame-retardant if it exhibits the following properties:

1. After flame time<15 sec
2. Drip flame time<5 sec
3. Burn length<200 mm

In the below tables summarizing the results obtained in the examples, values are given for after flame time and burn length. The drip flame time which was in most cases 0 sec (no drip-off) and in all cases<1 sec, is not reported.

2. Pressure-Sensitive Adhesive Tests a) Preparation of samples for pressure-sensitive adhesive tape tests A solution of the pressure-sensitive adhesive material, either solvent-borne or waterborne, was combined with the flame-retardant system and mixed to a homogeneous dispersion using a high speed commercial blender. Specific mixing conditions for each of the flame-retardant systems used are described in the related samples.

The solution of the adhesive composition containing the flame-retardant system was then coated onto a release liner using a knife coater at a thickness calculated to give a dry adhesive layer thickness of approximately 100 microns or less (actual thickness of the adhesive layer is given in the bales below). The layer of the adhesive composition was then dried. Water-borne adhesive compositions were dried for 10 min at 100° C. in a forced air oven and solvent-borne adhesive compositions were dried 10 min at room temperature (20° C.) and then 10 min at 70° C. in a forced air oven.

The layer of the adhesive composition was then transferred to the vapor-coated side of a 23 micron aluminum vapor-coated polyester film (PETP, Silber, Renker GmbH & Co KG) to create a single-sided adhesive tape which was used in static shear and 180° peel adhesion tests described below.

The 90° peel adhesion utilized a layer of the adhesive composition with no backing. The adhesive composition was laminated between an abraded aluminum panel (1.6 mm thick, available from Daimler-Benz Aerospace Airbus) and the textile material (Nomex, 750 g/m$^2$, Langenthal Corp., USA).

b) Static shear test

The shear strength of the pressure-sensitive adhesive composition of the present invention was evaluated using a modified version of industry standard method AFERA 4012. A single-side adhesive tape prepared as described above was adhered to a polished stainless steel panel (adhered area 1"×½") and suspended in a near vertical direction (2 degrees off of vertical). A weight of 1 kg was hung from the lower end of the adhesive tape sample. The time required for failure of the adhesive bond was measured in minutes. All failures were by cohesive failure of the adhesive mass. The value recorded is the averages of two measurements. The test was performed at room temperature.

c) Peel adhesion tests

I) 180° peel adhesion from aluminum

The adhesive strength of the pressure-sensitive tapes of the present invention was measured using a modified version of an industry standard test (AFERA 4001). A single-sided adhesive tape was adhered to an aluminum substrate (DIN1725T1 AlMg3, G22, 1 mm thick) and, after a dwell time of 10 min at room temperature, was peeled away from the bonded surface at an angle of 180° at a specified speed (300 mm/min). Each individual test was performed three times and an average value recorded in N/mm.

II) 180° peel adhesion from polyethylene

The adhesive strength was measured as in I), with the exception that a polyethylene substrate was provided for the peel adhesion tests by adhering a polyethylene film (325 μm thick) to the test plate with a double-coated adhesive tape (3M, double-coated tape 444).

III) 90° peel adhesion from textile

A second type of peel adhesion was also measured, in line with the transportation industry's need to adhere to the reverse side of textile surfaces used in aircraft interiors. This test was a 90° peel test measured according to DIN 53289. A strip of the dry pressure-sensitive adhesive layer (2.54 cm wide) was bonded to a cleaned and abraded aluminum panel (see above). The panel is abraded to improve anchoring to the layer of the pressure-sensitive adhesive composition.

Then a strip of the textile (Nomex, available from Langenthal Corp. U.S.A.) of the same width was bonded to the adhesive surface. The reverse side of the textile was bonded to the adhesive surface in this test, to stimulate attachment of the textile to an aircraft cabin. The aluminum/adhesive/textile laminate was then heated in a forced air oven at 70° C. for 10 min and finally conditioned at room temperature for 3 days before the peel test was measured at the rate of 100 mm/min. The peel adhesion force was recorded in N/mm.

Pressure-sensitive adhesives tested a) Pressure-sensitive adhesive material A

A copolymer of isooctyl acrylate (95.5 parts by weight) and acrylic acid (4.5 parts by weight) was prepared as a solution of 25% solids in a mixture of isopropanol and heptane (70:30 by weight). To 76.1 parts of this solution was added 23.9 parts by weight of a solution comprising a 47% by weight tackifying resin (Foral 95 hydrogenated rosin ester available from Hercules), 30% by weight heptane and 23% by weight toluene. The final solid content of the tackified adhesive was about 30.5%.

b) Pressure-sensitive adhesive material B

A copolymer of isooctyl acrylate (95.5 parts by weight) and acrylic acid (4.5 parts by weight) was prepared as a solution of 25% solids in a mixture of isopropanol and heptane (70:30 by weight).

c) Pressure-sensitive adhesive material C

Waterborne acrylic pressure sensitive adhesive, tackified with a rosin derivative, available as VANTAC 338j (ionic dispersion of an acrylic polymer and rosin derivative in water) from Rhône-Poulenc. The latex had a solids content of about 48%.

d) Pressure-sensitive adhesive material D

Water-borne acrylic pressure-sensitive adhesive, available as VANTAC 315 (anionic dispersion of acrylic polymer in water) from Rhône-Poulenc. The latex had solids content of about 50%.

e) Pressure-sensitive adhesive material E

Synthetic rubber-resin pressure-sensitive adhesive dissolved in solvent. Styrene-isoprene-styrene block copolymer (Kraton 1107 CS available from Shell) was combined with two tackifying resins (Escorez 1310 available from Exxon and Zonarez Alpha 25 available from Arizona Chemical) in the ratio of 33 parts to 44 parts to 22 parts, respectively, and dissolved in a toluene/heptane solvent mixture (77:23) at 60% solids. An antioxidant (Irganox 1076 from Ciba-Geigy) was also present in the amount of 1 part.

Flame-retardants tested a) Flame-retardant agent 1A

Red phosphorus, stabilized, microencapsulated with a melamine formaldehyde resin, Phosphorus content about 90%. Available from Hoechst as Hostaflam RP614. This form of phosphorus was used to mix with solvent-based adhesive.

b) Flame-retardant agent 1B

Red phosphorus, stabilized, microencapsulated with melamine formaldehyde resin in the form of a red-brown thixotropic aqueous paste (available as HOSTAFLAM RP 622, Hoechst). Water (50%), solid (50%). Contains about 45 weight percent phosphorus. This form of phosphorus was used to mix with water-borne adhesives.

c) Flame-retardant agent 2

Melamine cyanurate. White crystalline powder available from Chemie Linz (Austria).

d) Flame-retardant agent 3

Alumina trihydrate (65% Al2O3). Available as Solem Sb 632 from Solem Europe B.V.

e) Flame-retardant agent 4

Hexaphenoxycyclotriphosphazene, prepared by the method of Allcock and Walsh (J. Am. Chem. Soc. 91, 3102 (1969)) or commercially available from Nippon Soda (Japan) as P-3800.

f) Flame-retardant agent 5

Ethylene-bis-tetrabromophthalimide halogenated flame-retardant, available as SAYTEX BT 93 W from Albemarle, S.A.

EXAMPLES

Comparative Examples 1–5

A layer of each of the pressure-sensitive adhesives (A, B, C, D and E), containing no-flame-retardant agents, was coated and dried on a release liner, respectively, as described above. Portions of the adhesive layer were incorporated into laminates described above for evaluation of flame-retardance and portions of the adhesive layer were incorporated into single-sided pressure-sensitive adhesive tape constructions, also described above, for evaluation of pressure-sensitive adhesive properties. Flame-retardance and adhesive properties were then measured. The properties of these reference materials are shown in Tables 1–5, respectively.

Example 1

A combination of red phosphorus (flame-retardant agent 1A, described above) and alumina trihydrate (flame-retardant agent 3, described above) were added to a solution of a solvent-borne acrylate-based pressure-sensitive adhesive material (A) in the amount of 6 parts and 20 parts, respectively, based on 100 parts solid adhesive (pph). The mixing was accomplished by adding red phosphorus as described and aluminum trihydrate as described to the solvent-based pressure-sensitive adhesive material and mixing at 1500–2000 rpm for about 1 minute or until a homogeneous mixture was achieved. Heptane was then added in the amount of 40–50 parts based on 100 parts adhesive solution. This resulted in a homogeneous red brown composition which was then stirred further for 24 hours at about 150 rpm.

The resulting adhesive composition was coated onto a release liner and dried for 10 min at room temperature and then for 10 min at 70° C. in a forced air oven.

Portions of the layer of the adhesive composition were incorporated into laminates described above for evaluation of flame retardance and portions of the adhesive were incorporated into a single-sided pressure-sensitive adhesive tape construction, also described above, for evaluation for the effects of the flame-retardant on pressure-sensitive adhesive properties.

Flame-retardance and pressure-sensitive adhesive properties of the adhesive composition of the present invention are shown in Table 1 and 2, respectively.

Example 2

A combination of red phosphorus (flame-retardant agent 1A, described above) and melamine cyanurate (flame-retardant agent 2, described above) were mixed with pressure-sensitive adhesive mixture A in the amounts of 4 parts and 10 parts, respectively, based on 100 parts solid adhesive. The mixing was accomplished by the same procedure as in Example 1.

Test results for the same test procedures as in Example 1 are shown in Tables 1 and 2, respectively.

Examples 3–4

Melamine cyanurate (flame-retardant agent 2, described above) was mixed with pressure-sensitive adhesive material A in amounts of 20 parts and 40 parts, respectively, per 100 parts of solid adhesive material, using the same method as in Example 1. This resulted in an opaque white solution. Test results are shown in Tables 1 and 2.

Examples 5–7

Hexaphenoxycylotriphosphazene (flame-retardant agent 4, described above) was combined with 100 parts of pressure-sensitive adhesive material A in the amount of 15 parts, 30 parts and 50 parts, respectively, based on 100 parts solid adhesive. A solution of the phosphazene (50 parts by weight) was prepared in acetone. This solution was then added to the solvent-borne acrylic pressure-sensitive adhesive material using the same procedure as described in Example 1.

Coatings of the pressure-sensitive adhesive composition obtained in these examples showed an adhesive surface having some crystalline nature.

Flame-retardant and pressure-sensitive adhesive properties of the resulting adhesive composition, respectively, are shown above in Tables 1 and 2.

Examples 8–12

Hexaphenoxycyclotriphosphazene (flame-retardant agent 4) was used in combination with other flame-retardant agents (1A, 2 and 5, described above).

A solution of the phosphazene in acetone (as described in example 6) was added to the solvent-borne pressure-sensitive adhesive described above as adhesive material A. Other flame-retardant agents were added to the adhesive solution in solid form, independently from the phosphazene solution. The amounts of the flame-retardant agents used, can be taken from Tables 1 and 2.

Adhesive coatings prepared from these examples showed some crystalline nature as a result of the presence of the phosphazenes.

Flame-retardance and pressure-sensitive adhesive properties of the resulting adhesive compositions are summarized in Tables 1 and 2.

Examples 13–16

Pressure-sensitive adhesive compositions were prepared according to the method described in Example 1 with the exceptions that pressure-sensitive adhesive material B and the flame-retardant agents given in Table 3 were used. The amounts of the flame-retardant agents can also be taken from Table 3.

The flame-retardant properties of the resulting pressure-sensitive adhesive compositions are summarized in Table 3. The pressure-sensitive adhesive compositions and the corresponding tapes were, furthermore, found in other experiments not reported here, to have advantageous properties.

Examples 17–19

Flame-retardant agents were mixed with pressure-sensitive adhesive material C in amounts given in Tables 4 and 5. The mixing was accomplished by first preparing a premix of the flame-retardant agents in about one quarter of the finished adhesive volume. The premix was stirred at 2000 rpm for about a min. Then the remainder of the adhesive latex was added to the premix at a stirring rate of about 150 rpm. Stirring was continued for about 24 hours at 150 rpm.

Flame-retardant properties and pressure-sensitive adhesive properties of the resulting pressure-sensitive adhesive compositions are summarized in Tables 4 and 5, respectively.

Examples 20–22

Flame-retardant agents were mixed with pressure-sensitive adhesive material D in amounts given in Table 6 according to the method described in Example 19.

Flame-retardant properties of the resulting pressure-sensitive adhesive compositions are summarized in Table 6. The materials were, furthermore, found in other experiments not reported here, to have advantageous adhesion properties.

Examples 23–24

Flame-retardant agents were mixed with pressure-sensitive adhesive material E in amounts given in Tables 7 and 8 according to the method described in Examples 1 and 6, respectively, without diluting, however, with heptane.

Flame-retardant and adhesion properties of the resulting pressure-sensitive adhesive compositions are summarized in Tables 7 and 8.

TABLE 1

Summary of flame-retardance properties of examples based on pressure-sensitive adhesive material A

| Example | Adh. Type (thickness in μm) | Flame Retardant Agent Type (pph) | Test Laminate Type | Burn length, (mm) | After Flame Time (sec) |
|---|---|---|---|---|---|
| Comp 1 | A (93) | None (0) | PE/Al | 135 | 36 |
| Comp 1 | A (100) | None (0) | PE/PP | 111 | 96 |
| 1 | A (90) | 1A (6), 3 (20) | PE/Al | 99 | 5 |
| 1 | A (90) | 1A (6), 3 (20) | PE/PP | 58 | 9 |
| 2 | A (93) | 1A (4), 2 (10) | PE/Al | 125 | 5 |
| 2 | A (93) | 1A (4), 2 (10) | PE/PP | 65 | 7 |
| 3 | A (108) | 2 (20) | PE/Al | 119 | 11 |
| 4 | A (99) | 2 (40) | PE/Al | 122 | 6 |
| 5 | A (100) | 4 (15) | PE/Al | 132 | 11 |
| 6 | A (110) | 4 (30) | PE/Al | 118 | 4 |
| 7 | A (110) | 4 (50) | PE/Al | 91 | 3 |
| 8 | A (110) | 4 (10), 1A (4) | PE/Al | 81 | 2 |
| 9 | A (108) | 4 (20), 2 (10) | PE/Al | 92 | 5 |
| 10 | A (112) | 4 (20), 2 (20) | PE/Al | 104 | 3 |
| 11 | A (112) | 4 (20), 5 (10) | PE/Al | 85 | 2 |
| 12 | A (115) | 4 (20), 5 (20) | PE/Al | 88 | 2 |

TABLE 2

Summary of pressure sensitive adhesive properties of examples based on pressure-sensitive adhesive material A

| Example | Adh. Type (thickness in μm) | Flame Retardant Agent Type (pph) | Static Shear (min) | Peel adh. 180 deg, Al (N/25.4 mm) | Peel adh. 180 deg, PE (N/25.4 mm) | Peel adh. 90 deg., textile (N/25.4 mm) |
|---|---|---|---|---|---|---|
| Comp 1 | A (93) | None (0) | 390 | 25.7 a | 9.6 a | 10.0 |
| 1 | A (90) | 1A (6), 3 (20) | 644 | 20.4 a | 7.4 a | 14.0 |
| 2 | A (93) | 1A (4), 2 (10) | 542 | 21.8 a | 7.4 a | 15.7 |
| 3 | A (108) | 2 (20) | 1143 | 21.2 a | 8.4 a | — |
| 4 | A (99) | 2 (40) | 1935 | 23.7 a | 6.1 a | 7.5 |
| 5 | A (100) | 4 (15) | 376 | 20.0 c | 7.7 a | 12.3 |
| 6 | A (110) | 4 (30) | 420 | 21.7 c | 13.9 a | 13.5 |
| 7 | A (110) | 4 (50) | 166 | 19.3 c | 15.1 a | — |
| 8 | A (110) | 4 (10), 1A (4) | 444 | 22.2 c | 10.8 a | 10.0 |
| 9 | A (108) | 4 (20), 2 (10) | 464 | 21.1 c | 8.7 a | 12.9 |
| 10 | A (112) | 4 (20), 2 (20) | 520 | 21.5 c | 6.9 a | 13.3 |
| 11 | A (112) | 4 (20), 5 (10) | 431 | 8.6 d (s) | 13.8 a | — |
| 12 | A (115) | 4 (20), 5 (20) | 466 | 22.2 d (s) | 10.9 a | — | a = adhesive failure (clean peel of the PSA from the bonded surface)
c = cohesive failure or adhesive split
d = delamination of the adhesive from the backing
(s) = shocky peel

TABLE 3

Summary of flame-retardant properties of examples based on pressure sensitive adhesive material B

| Example | Adh. Type (thickness in μm) | Flame Retardant Agent Type (pph) | Test Laminate Type | Burn length, (mm) | After Flame Time (sec) |
|---|---|---|---|---|---|
| Comp 2 | B (60) | None (0) | PE/Al | 273 | 39 |
| 13 | B (52) | 1A (4), 3 (15) | PE/Al | 185 | 10 |
| 14 | B (51) | 1A (5), 3 (25) | PE/Al | 146 | 6 |
| 15 | B (53) | 1A (8), 3 (20) | PE/Al | 144 | 2 |
| 16 | B (63) | 1A (4), 2 (10) | PE/Al | 170 | 8 |

TABLE 4

Summary of flame-retardant properties of examples based on pressure-sensitive adhesive material C

| Example | Adh. Type (thickness in μm) | Flame Retardant Agent Type (pph) | Test Laminate Type | Burn length, (mm) | After Flame Time (sec) |
|---|---|---|---|---|---|
| Comp 3 | C (90) | None (0) | PE/Al | 126 | 24 |
| 17 | C (84) | 1B (12), 3 (20) | PE/Al | 157 | 7 |
| 17 | C (84) | 1B (12), 3 (20) | PE/PP | 67 | 25 |
| 18 | C (88) | 1B (8), 2 (10) | PE/Al | 144 | 8 |
| 18 | C (88) | 1B (8), 2 (10) | PE/PP | 61 | 8 |
| 19 | C (89) | 1B (8), 5 (6)[b] | PE/Al | 131 | 5 |
| 19 | C (89) | 1B (8), 5 (6)[b] | PE/PP | 70 | 7 |

[b]Flame-retardant agent 5 forms agglomerates in the water-based pressure-sensitive adhesive material

TABLE 5

Summary of pressure-sensitive adhesive properties of examples based on pressure-sensitive adhesive material C

| Example | Adh. Type (thickness in μm) | Flame Retardant Agent Type (pph) | Static Shear (min) | Peel adhesion 180 deg, Al (N/25.4 mm) | Peel adhesion 180 deg, PE (N/25.4 mm) | Peel adh. 90 deg, textile (N/25.4 mm) |
|---|---|---|---|---|---|---|
| Comp 3 | C (90) | None (0) | 113 | 31.3 a | 30.7 a | 9.1 |
| 17 | C (84) | 1B (12), 3 (20) | 117 | 32.3 a | 31.2 a | 5.2 |
| 18 | C (84) | 1B (3), 2 (10) | 240 | 32.9 a | 31.2 a | 6.3 |
| 19 | C (89) | 1B (8), 5 (6)[b] | 100 | 27.7 a | 23.3 a | 7.0 | a) = cohesive failure or adhesive split
[b]Flame-retardant agent 5 forms agglomerates in the water-based pressure-sensitive adhesive material

TABLE 6

Summary of flame-retardant properties of examples based on pressure-sensitive adhesive material D

| Example | Adh. Type (thickness in µm) | Flame Retardant Agent Type (pph) | Test Laminate Type | Burn length, (mm) | After Flame Time (sec) |
|---|---|---|---|---|---|
| Comp 4 | D (76) | None (0) | PE/Al | 300 | 72 |
| 20 | D (72) | 1B (10) | PE/Al | 300 | 38 |
| 21 | D (66) | 1B (8), 3 (15) | PE/Al | 226 | 26 |
| 22 | D (83) | 1B (5), 2 (6) | PE/Al | 175 | 12 |

TABLE 7

Summary of pressure-sensitive adhesive properties of examples based on pressure-sensitive adhesive material D

| Example | Adh. Type (thickness in µm) | Flame Retardant Agent Type (pph) | Static Shear (min) | Peel adhesion 180 deg, Al (N/25.4 mm) | Peel adhesion 180 deg, PE (N/25.4 mm) | Peel adh. 90 deg, textile (N/25.4 mm) |
|---|---|---|---|---|---|---|
| Comp 5 | E (102) | None (0) | >10,000 | 22.2 | 19.2 | 11.0 |
| 23 | E (103) | 1A (4), 2 (10) | >10,000 | 25.6 | 17.8 | 8.9 |
| 24 | E (105) | 4 (30) | 69.5 | 20.5 | 19.6 | 2.7[a] |

[a] Crystalline adhesive layer

TABLE 8

Summary of flame-retardant properties of examples based on pressure-sensitive adhesive material D

| Example | Adh. Type (thickness in µm) | Flame Retardant Agent Type (pph) | Test Laminate Type | Burn length, (mm) | After Flame Time (sec) |
|---|---|---|---|---|---|
| Comp 5 | E (102) | Non3 | PE/Al | 300 | 39 |
| 23 | E (103) | 1A (4), 2 (10) | PE/Al | 237 | 10 |
| 24 | E (105) | 4 (30) | PE/Al | 180 | 7 |

What is claimed is:

1. A pressure-sensitive adhesive composition comprising a pressure sensitive adhesive material and a non-halogen, non-intumescent flame-retardant system comprising at least one N-containing flame-retardant agent selected from the group consisting of melamines, triazines, isocyanurates, cyanuric acids, urea and guanidine, with the provisos that the flame-retardant system does not comprise $Sb_2O_3$ and does not consist only of alumina trihydrate, wherein the pressure-sensitive adhesive composition is flame retardant as determined by FAR 25.853.

2. A pressure-sensitive adhesive composition comprising a pressure sensitive adhesive material and a non-halogen, non-intumescent N/P-containing flame-retardant system comprising hexaphenoxycyclotriphosphazene, with the provisos that the flame-retardant system does not comprise $Sb_2O_3$ and does not consist only of alumina trihydrate, wherein the pressure-sensitive adhesive composition is flame retardant as determined by FAR 25.853.

3. A pressure-sensitive adhesive composition comprising a pressure sensitive adhesive material and a non-halogen, non-intumescent flame-retardant system comprising elemental red phosphorus and alumina trihydrate with the proviso that the flame-retardant system does not comprise $Sb_2O_3$, and wherein the pressure-sensitive adhesive composition is flame retardant as determined by FAR 25.853.

4. A pressure-sensitive adhesive composition comprising a pressure sensitive adhesive material and a non-halogen, non-intumescent flame-retardant system comprising at least one N-containing flame-retardant agent selected from the group consisting of melamines, triazines, isocyanurates, cyanuric acids, urea and guanidine, with the proviso that the flame-retardant system does not comprise $Sb_2O_3$, wherein the pressure-sensitive adhesive composition is flame retardant as determined by FAR 25.853.

5. A pressure-sensitive adhesive composition comprising a pressure sensitive adhesive material and a non-halogen, non-intumescent flame-retardant system comprising elemental red phosphorus and melamine cyanurate with the proviso that the flame-retardant system does not comprise $Sb_2O_3$, and wherein the pressure-sensitive adhesive composition is flame retardant as determined by FAR 25.853.

6. A pressure-sensitive adhesive composition according to claim 1 which comprises a rubber resin material selected from the group consisting of natural rubbers and synthetic rubbers.

7. A pressure-sensitive adhesive composition according to claim 6 which additionally comprises from 40 to 150 parts tackifying resin by weight per 100 parts by weight of rubber resin material, said tackifying resin being selected from the group consisting of glyceryl esters of hydrogenated resins, thermoplastic terpene resins, petroleum hydrocarbon resins, coumarone-indene resins, synthetic phenol resins, and tackifying silicone resins.

8. A pressure-sensitive adhesive composition according to claim 1 comprising an acrylic adhesive material which is selected from the group consisting of homopolymers and copolymers of acrylic acid, methacrylic acid, isooctyl acrylate, acrylamide, methacrylamide, acrylonitrile, methacrylonitrile, isoamyl acrylate, isobornylacrylate and 2-ethyl hexylacrylate.

9. A pressure-sensitive adhesive composition according to claim 1 wherein the composition further comprises a P-containing flame-retardant agent selected from the group consisting of phosphines, phosphine oxides, phosphonium compounds, phosphonates, elemental red phosphorus, and phosphites.

10. A pressure-sensitive adhesive composition according to claim 9 wherein the ratio of the weight of N-containing to the weight of P-containing flame-retardant agents is between 0.05 and 5.

11. A pressure-sensitive adhesive composition according to claim 3 which comprises a rubber resin material selected from the group consisting of natural rubbers and synthetic rubbers.

12. A pressure-sensitive adhesive composition according to claim 11 which additionally comprises from 40 to 150 parts tackifying resin by weight per 100 parts by weight of rubber resin material, said tackifying resin being selected from the group consisting of glyceryl esters of hydrogenated resins, thermoplastic terpene resins, petroleum hydrocarbon resins, coumarone-indene resins, synthetic phenol resin, and tackifying silicone resins.

13. A pressure-sensitive adhesive composition according to claim 11 comprising an acrylic adhesive material which is selected from the group consisting of homopolymers and copolymers of acrylic acid, methacrylic acid, isooctyl acrylate, acrylamide, methacrylamide, acrylonitrile, methacrylonitrile, isoamyl acrylate, isobornylacrylate and 2-ethyl hexylacrylate.

14. A pressure-sensitive adhesive composition according to claim 5 which comprises a rubber resin material selected from the group consisting of natural rubbers and synthetic rubbers.

15. A pressure-sensitive adhesive composition according to claim 14 which additionally comprises from 40 to 150 parts tackifying resin by weight per 100 parts by weight of rubber resin material, said tackifying resin being selected from the group consisting of glyceryl esters of hydrogenated resins, thermoplastic terpene resins, petroleum hydrocarbon resins, coumarone-indene resins, synthetic phenol resins, and tackifying silicone resins.

16. A pressure-sensitive adhesive composition according to claim 5 comprising an acrylic adhesive material which is selected from the group consisting of homopolymers and copolymers of acrylic acid, methacrylic acid, isooctyl acrylate, acrylamide, methacrylamide, acrylonitrile, methacrylonitrile, isoamyl acrylate, isobornylacrylate and 2-ethyl hexylacrylate.

17. A pressure-sensitive adhesive composition according to claim 6 wherein the synthetic rubbers are polybutadienes, polyisobutylenes, or silicone based rubbers.

18. A pressure-sensitive adhesive composition according to claim 11 wherein the synthetic rubbers are polybutadienes, polyisobutylenes, or silicone based rubbers.

19. A pressure-sensitive adhesive composition according to claim 14 wherein the synthetic rubbers are polybutadienes, polyisobutylenes, or silicone based rubbers.

* * * * *

UNITED STATES PATENT AND TRADEMARK OFFICE
CERTIFICATE OF CORRECTION

PATENT NO.    : 6,022,914
DATED         : February 8, 2000
INVENTOR(S)   : Petra Nowak, Robert D. Waid, and William D. Coggio It is certified that error appears in the above-identified patent and that said Letters Patent is hereby corrected as shown below:

Title page,
First column, under "U.S. PATENT DOCUMENTS," the following should be added:

| | | |
|---|---|---|
| -- 2,775,260 | 7/17/56  | Stilbert et al. |
| 3,336,153    | 8/15/67  | Juda |
| 3,449,161    | 6/10/69  | Hindersinn et al. |
| 3,934,066    | 1/20/76  | Murch |
| 4,052,483    | 10/4/77  | Feeney et al. |
| 4,239,670    | 12/16/80 | Moorman |
| 4,415,615    | 11/15/83 | Esmay et al. |
| 4,496,685    | 1/29/85  | Nagasawa et al. |
| 4,880,681    | 11/14/89 | Price et al. |
| 5,010,113    | 4/23/91  | Blout |
| 5,153,245    | 10/6/92  | Cipolli et al. |
| 5,192,612    | 3/9/93   | Otter et al. |
| 5,200,445    | 4/6/93   | Cipolli et al. |
| 5,225,463    | 7/6/93   | Cipolli et al. |
| 5,286,775    | 2/15/94  | Bandyopadhyay |
| 5,409,976    | 4/25/95  | Lindsay |
| 5,650,215    | 7/22/97  | Mazurek et al. |

Second column, under "FOREIGN PATENT DOCUMENTS," the following should be added:

| | | |
|---|---|---|
| -- 0 204 027 A1 | 12/10/86 | EPO |
| 0 413 613 A1    | 2/20/91  | EPO |
| 29 38 874 A1    | 9/26/97  | Germany |
| 2245286 A       | 1/2/92   | Great Britain |
| 2272444 A       | 5/18/94  | Great Britain |
| 50-13836        | 5/22/75  | Japan |
| 58-127746       | 7/29/83  | Japan |
| 64-54078        | 3/1/89   | Japan |
| 5-345881        | 12/27/93 | Japan |
| WO 93/22373     | 11/11/93 | PCT --; |

UNITED STATES PATENT AND TRADEMARK OFFICE
CERTIFICATE OF CORRECTION

PATENT NO. : 6,022,914
DATED : February 8, 2000
INVENTOR(S) : Petra Nowak, Robert D. Waid, and William D. Coggio It is certified that error appears in the above-identified patent and that said Letters Patent is hereby corrected as shown below:

Title page,
Under "OTHER PUBLICATIONS," the following should be added:
-- Babrauskas, Vytenis, "The Cone Calorimeter - A New Tool for Fire Safety Engineering," ASTM Standardization News, January 1990, pp. 32-35.
Weil, Edward D., "Additivity, Synergism, and Antagonism in Flame Retardancy," Flame Retardancy of Polymeric Materials, Volume 3, Marcel Dekker, Inc., 1975, pp. 185-243. --;
Line 12, "44 19 169 a1" should read -- 44 19 169 A1 --;
Line 21, "1 309 873    7/1973" should read -- 1 309 873    3/1973 --;

Column 1,
Line 42, "dame" should read -- damage --;

Column 4,
Line 34, "phenol" should read -- pheol --;

Column 8,
Line 3, "polimide" should read -- polyimide --;
Line 4, "pololefins" should read -- polyolefins --;
Line 66, After "flame-retardance" insert -- pressure-sensitive adhesive composition under actual use conditions. Two different --;

Column 9,
Line 4, "K opp" should read -- Kopp --;
Line 67, "bales" should read -- tables --;

Column 16,
Line 61, "1B(3), 2(10)" should read -- 1B(8), 2(10) --;

UNITED STATES PATENT AND TRADEMARK OFFICE
CERTIFICATE OF CORRECTION

PATENT NO. : 6,022,914
DATED : February 8, 2000
INVENTOR(S) : Petra Nowak, Robert D. Waid, and William D. Coggio It is certified that error appears in the above-identified patent and that said Letters Patent is hereby corrected as shown below:

Column 17,
Line 20, "material D" should read -- material E --;
Line 34, "material D" should read -- material E --; and Column 19,
Line 8, "claim 11" should read -- claim 3 --.

Signed and Sealed this

Thirteenth day of November, 2001

Attest:

NICHOLAS P. GODICI
*Acting Director of the United States Patent and Trademark Office*

*Attesting Officer*